United States Patent Office 3,313,694
Patented Apr. 11, 1967

3,313,694
PROCESS FOR DE-ASHING BASIC
ANTIBIOTICS
Robert C. Ayers, Jr., Groton, Conn., and James V. Kehoe, Glendale, N.Y., assignors to Chas. Pfizer & Co., Inc., New York, N.Y., a corporation of Delaware
No Drawing. Filed Apr. 30, 1962, Ser. No. 191,332
10 Claims. (Cl. 167—65)

This invention relates to processes for purification of basic antibiotics. More particularly, it relates to an improvement in a method for removal therefrom of inorganic contaminating substances. These substances are commonly copresent with the antibiotics in solution, said solutions comprising fermentation broths in which the antibiotics are formed or the various processing streams encountered in plant operations during which antibiotics are recovered and purified.

The antibiotics to which this invention relates, the so-called basic antibiotics, are characterized by the presence of basic nitrogen groups as, for example, the guanidino group. These antibiotics, typical examples of which are streptomycin, neomycin and viomycin, are formed in fermentation media containing organic and inorganic substances which, if they are not removed during recovery operations, tend to reduce the potency of the antibiotics, add to their color, and interfere in subsequent processes such as crystallization. This invention is particularly concerned with an improved method for the removal of monovalent inorganic cations, of which sodium ion is the most commonly encountered. Furthermore, as will be shown hereinafter, application of the process of this invention in combination with chelating steps facilitates removal of copresent polyvalent inorganic cations such as calcium and magnesium, and polyvalent cations comprising a relatively minor proportion of the total amount of inorganic contamination.

The so-called "ash content" of the antibiotic-containing material is related to the relative amount of inorganic cation contamination; higher ash contents indicate higher inorganic cation contents. Ash contents are ordinarily determined by evaporation of a measured portion of the antibiotic solution followed by burning the residue completely to ash in the presence of sulfuric acid. The ash contents are expressed as a percentage by weight of the residue based on the antibiotic content of the measured portion taken. For example, a typical streptomycin fermentation broth known to contain 10 milligrams per milliter of antibiotic and found to contain 20 milligrams of ash per milliter (in the form of sulfated ash) is said to have an ash content of 200 percent.

It is known to the art that ion-exchange resins can be used to separate organic and inorganic impurities from basic antibiotics. Such purification techniques may involve, for example, removal of basic antibiotics and inorganic cations from impure fermentation broths by adsorption onto particulate cation-exchange resins in the sodium cycle, elution of the adsorbed antibiotic and inorganic cations with strong acid and, after neutralization, removal of the inorganic cations by adsorption onto a particulate cation-exchange resin in the hydrogen cycle. The basic antibiotics thus obtained contain a diminished but nevertheless appreciable quantity of ash-forming material.

These techniques have been improved in such commercially important processes as are disclosed, for example, in U.S. Patents 2,842,412, and 2,960,437, assigned to the assignee of the present invention. These improved processes yield antibiotics of exceptional purity and relatively low ash contents. However, for the removal of cations, said patented processes employ on the one hand, a specially prepared cation-exchange resin which is rather soft and difficult to handle on a large scale and, on the other, substitution of a relatively large bed of cation-exchange resin to replace the aforesaid special resin. Although significant cost savings are realized by elimination of the special resin bed, in practice, the larger replacement bed necessitates the use of slower flow rates and, in addition, somewhat higher antibiotic losses are experienced.

These disadvantages are eliminated as is shown in the copending application of J. V. Kehoe and E. G. Martin, Ser. No. 843,643, filed Oct. 1, 1959 and now abandoned and the use of specially prepared resins and large final resin beds can be dispensed with. According to the disclosure therein, inorganic cations are preferentially removed from the primary resin bed which also contains adsorbed basic antibiotics when said resin bed is eluted with a solution of chelating agent and a weak acid. Subsequent elution of the antibiotic with strong mineral acid in accordance with standard procedures produces an eluate from which the antibiotics is isolated with relatively low ash content.

While the process of the invention of said copending application eliminates the need for adsorbing the antibiotic on a second resin column, permits recovery of a higher quality antibiotic and requires much less processing time, the fact that the ionic strength of the solution in contact with the adsorbate bed continually varies has a tendency to cause difficulty in large scale operation. Thus, it is sometimes found that the antibiotic has a slightly higher ash content than normal and that there may be observed an increase in the loss of antibiotic by desorption. The instant invention is concerned with a means to minimize the tendency for said increases in ash contents and losses of antibiotic to occur.

It has now been found that, if the inorganic ions are removed from the primary resin bed by elution with a weakly acidic aqueous solution and are trapped in a second, smaller cation-exchange bed in the hydrogen form (hereinafter referred to as the "ash-trap") and the effluent therefrom is recirculated to the primary bed, it is possible to obtain precise control of the conditions necessary to achieve very low ash content and minimum loss of antibiotic by desorption. Moreover, should it prove to be desirable to obtain even lower ash contents, it has been found that use of the improved process of this invention in combination with chelating steps and together with a final resin bed of only one-fourth the size of those required previously is sufficient to decrease the final ash content to 0.2 percent which is, surprisingly, less than half the ash content found in products prepared in presently preferred commercial processes. A particularly valuable advantage arising from application of the present invention and the use of a smaller final purification bed is that losses of antibiotic are only about one-tenth as great as previously experienced.

It is to be understood that if the valuable process of the present invention is used without resorting to chelating steps, there is a tendency for the ultimate ash content to be somewhat higher. However since the monovalent ions removed by this improved process predominate to the extent of at least 90 percent by weight of initial inorganic contamination, this improved process can be advantageously employed without chelating steps. However, as is disclosed in said copending application and as will be exemplified hereinafter, to obtain basic antibiotic solutions with the highest ultimate purity it is preferred to use a chelating step before, or after, or in combination with the improved process of the present invention.

It is an object of this invention, therefore, to provide an improved means for obtaining an antibiotic sufficiently free of inorganic cations after one adsorption step that further ion exchange treatment after elution is unnecessary.

It is a further object of this invention to provide an improved means to reduce the volume of any secondary ion exchange purification beds which it may be desired to use to obtain the lowest ash contents.

A still further object is to provide a means for obtaining basic antibiotics with substantially lower ash contents than have been previously obtainable in commercial operations.

Still another object of this invention is to directly remove contaminating ions from antibiotic adsorbates in such a manner that substantially none of said antibiotic is desorbed therewith, thus eliminating a costly subsequent recovery step.

These objects are accomplished in the process of this invention which in essence comprises circulating a solution adjusted to a pH of about 4.0 to about 7.5—first through a basic antibiotic adsorbed on a particulate cation-exchange resin, then through a second particulate cation-exchange resin in the acid form, then returning the effluent from the second resin to the first and thus completing the cycle. These steps are effective in removing substantially all of the inorganic cations coadsorbed on the first resin with said basic antibiotic and in depositing said cations on the second resin and, after subsequent elution of the first type resin with an aqueous acid, a solution of antibiotic is obtained with exceedingly low ash content, in fact, substantially lower in ash content than corresponding eluates prepared by the prior art processes mentioned before. By way of illustration, in one of the current processes employing two different cation-exchange resins with an adsorption and elution from each, four to eight percent ash is present in the eluate from the second adsorption bed. In another commercial process which employs one cation-exchange resin, 25 to 50 percent ash is present in the eluate from the primary adsorption bed. In eluates prepared by the process of the present invention in which one primary adsorption bed was used and cations were removed by cycling an aqueous solution adjusted to a pH of 4.0 to 7.5 to a small, external bed, only one to three percent ash is present in the eluate from the primary adsorption bed. The antibiotic obtained at this stage is so free of contamination by inorganic ions that it can be used without further purification for many pharmaceutical applications.

Products of exceedingly high final purity which may be required in certain instances and extremely difficult to obtain in commercial operations are readily prepared by application of the process of this invention if the eluate from the adsorbate is passed through a final cation-exchange resin bed as is disclosed in aforesaid patents. Here it is found that eluates prepared according to the improved process of present invention give lower final ash contents than do corresponding eluates prepared as disclosed in the patents mentioned. Use of the instant invention leads to final ash contents of 0.2–0.3 percent as contrasted with minimum final ash contents of 0.6 percent obtained by said prior art processes.

As has been mentioned before, an important consequence in the practice of the instant invention is that, if used, a final purification bed need be only about one-fourth as large as the corresponding final purification beds required in previously disclosed processes. This is a result of the much higher degree of purity of eluates obtained by removal of cations prior to elution of the antibiotic and in addition to obvious savings in the cost of cation-exchange resin, the smaller bed size permits higher flow rates through the bed and minimizes loss of the antibiotic by unwanted adsorption.

A singular advantage in operation according to the present invention arises from the cyclical mode of its application: the de-ashing solution is regenerated by passage through the "ash-trap," and upon return to the "adsorbate" the ability to remove inorganic cations is completely restored. This allows the volume of de-ashing solution to be maintained constant and lower than in the prior art procedure relative to that of the "adsorbate" bed. As a consequence of operation at volumes corresponding to about 2–3 adsorbate bed volumes and continual regeneration of the solution, enhanced control of pH and ionic strength is possible and losses of antibiotics by desorption from the primary resin bed are minimized.

Among the disadvantages of prior art practices comprising treatment of the antibiotic adsorbate or eluate with acidic de-ashing solutions, or with chelating agents, or with both in combination, are losses of adsorbed antibiotics by desorption from the primary resin bed, losses of chelating agents, and undue consumption of acids. If the ash-trap contemplated by the present invention is not used, there exists a tendency for antibiotics to be lost by desorption during the process since ionic strength and acidity are built up during contact with the aforesaid solutions. Chelating agents are lost because of difficulty in recovering them from large volumes of very dilute solutions. Marked difficulty is also encountered when it is desired to recover water-soluble acids from very dilute solutions. These aforesaid losses of antibiotic through simultaneous elution with inorganic cations may be as high as 10 to 17 percent of the adsorbed amount when the de-ashing process is carried out without the ash-trap contemplated in the instant invention. With the ash-trap, it is very easy to control at a level of only one to three percent aforesaid losses of antibiotics by desorption. Of course, the desorbed antibiotics can be recovered by recycling the effluent over a fresh primary bed. However, these recovery steps add substantially to the cost of production and it is very advantageous to minimize the loss by means of the present invention.

Of course, as will be obvious to those skilled in the art, the improved process of the instant invention may be advantageously employed in a number of distinct embodiments. Several of these embodiments will be exemplified in detail hereinafter but it is to be understood that the invention is not to be limited thereby.

The following description relates to procedures employing the improved process of the present invention as an integral part thereof.

One embodiment is represented by the following flow diagram:

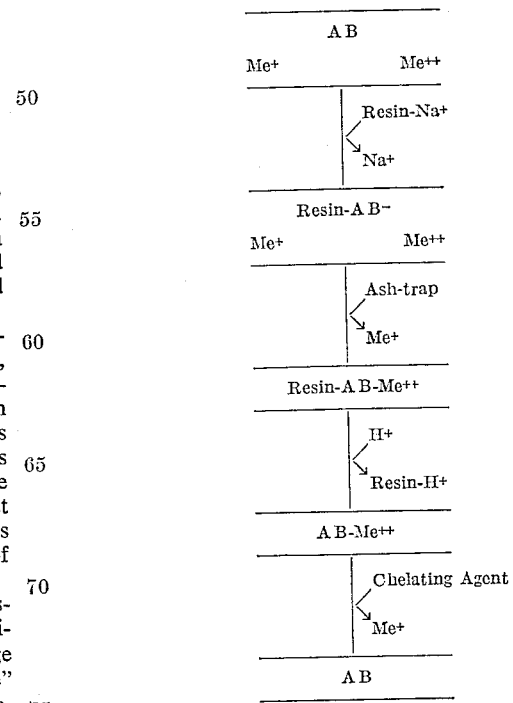

Wherein AB refers to basic antibiotic, Me+ refers to monovalent inorganic cation, Me++ refers to polyvalent inorganic cation, Resin refers to cation-exchange resin, Ash-trap refers to a small external bed of cation-exchange resin, chelating agent refers to a reagent with the capacity to sequester said polyvalent inorganic cations, and H+ to an acidic aqueous solution of sufficient strength to elute adsorbed basic antibiotics.

In this embodiment the aqueous solution of basic antibiotic containing monovalent and polyvalent inorganic cations is contacted with a particulate carboxylic acid-type cation-exchange resin until said basic antibiotic and cations are substantially completely adsorbed thereon, said process step being in accord with that disclosed in U.S. Patent 2,960,437. The resin adsorbate is then contacted with an aqueous solution adjusted to a pH of from about 4.0 to about 7.5 and the effluent from the adsorbate bed is next passed into contact with a second, smaller bed of cation-exchange resin in the hydrogen ion form (the ash-trap). The effluent from the ash-trap bed is recycled to the adsorbate bed and recycling is continued until all of the monovalent inorganic cations have been transferred to the ash-trap bed. The antibiotic and polyvalent inorganic cations are then eluted from the adsorbate by displacement with stronger aqueous acid (for example, 0.75 N sulfuric acid). After neutralization of the excess sulfuric acid in the eluate, the polyvalent inorganic cations are removed from the solution, for example, by precipitation as an insoluble salt after addition of sodium oxalate.

A second embodiment is represented by the following flow diagram:

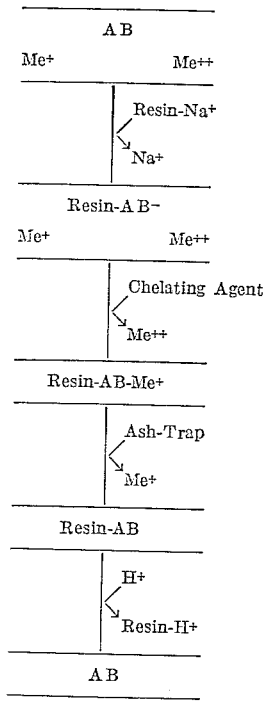

wherein the symbols are as hereinbefore defined.

In this second embodiment, the aqueous solution of basic antibiotic containing monovalent and polyvalent inorganic cations is contacted with an ion-exchange resin and adsorbate is formed as is described in the first embodiment. The adsorbate is then contacted with a solution of a polyvalent ion-complexing agent adjusted to a pH of about 7.0 to about 7.5 and said contact is maintained until the polyvalent inorganic cations have been substantially completely removed from the adsorbate. The resin adsorbate is then contacted with an aqueous solution adjusted to a pH of from about 4.0 to about 7.5 and the effluent from the adsorbate bed is next passed into contact with a second, smaller bed of cation exchange resin in the hydrogen ion form (the ash-trap). The effluent from the ash-trap bed is recycled to the adsorbate bed and recycling is continued until substantially all of the monovalent inorganic cations have been transferred to the ash-trap bed. The antibiotic is then eluted by treatment of the adsorbate bed with stronger aqueous acid (for example, 0.75 N sulfuric acid). The excess sulfuric acid in the eluate is then neutralized.

A third embodiment is represented by the following flow diagram:

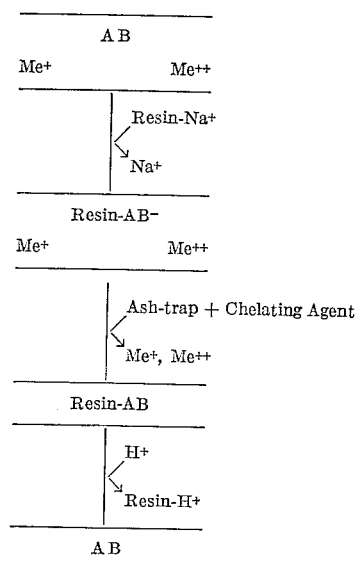

wherein the symbols are as hereinbefore defined.

In this third embodiment, the aqueous solution of basic antibiotic containing monovalent and polyvalent inorganic cations is contacted with an ion-exchange resin and an adsorbate is formed as in the previous two embodiments. The adsorbate is then contacted with an aqueous solution of a chelating agent adjusted to a pH of from about 4.0 to about 7.5 and the effluent from the adsorbate bed is next passed into contact with a second, smaller bed of cation-exchange resin in the hydrogen ion form (the ash-trap). The effluent from the ash-trap is recycled to the adsorbate bed and recycling is continued until substantially all of the monovalent and polyvalent inorganic cations have been transferred to the ash-trap bed. The antibiotic is then eluted by treatment of the adsorbate bed with stronger aqueous acid (for example, 0.75 N sulfuric acid). The excess sulfuric acid in the eluate is then neutralized.

In the practice of the process of this invention, the resin bed saturated with antibiotic and the cations can be confined in a tower, kettle, or other suitable vessel. The adsorbate is usually washed with water to free it of residual broth, although this is not necessary in all instances. A particularly convenient volume of the de-ashing solution to be employed is equivalent to from about two to three adsorbate bed volumes. It is preferred to maintain contact by circulation of the solution through the bed as with a pump or by other means, although it is possible to achieve substantially the same result by a portionwise batch-process treatment, by percolation through the adsorbate with the aid of gravity, or by similar means. The time at which said contact by the de-ashing solution is to be stopped is determined by measurement of the pH of the effluent solution. The pH shows a decrease during de-ashing and finally reaches a limiting value (usually about 6) after which circulation is stopped. During this de-ashing step, monovalent cations such as sodium are displaced from the adsorbate and are replaced by hydrogen ion. When chelating agents are added to the de-ashing solution, the third embodiment hereinbefore described, polyvalent inorganic cations such as calcium are removed during this step also.

The cation-exchange resin used in the ash-trap can be similar to, or identical with the resin used in the first bed but preferably derives its cation-exchange capacity from sulfonic acid groups and, ideally, has a low adsorption capacity for streptomycin and other basic antibiotics. It is in this second bed or ash-trap that the inorganic cations are removed from the effluent of the first bed gradually and hydrogen ions are exchanged therefor. The effluent from the second bed gradually increases in pH from about 2.0 to about 5.0 during this operation. Circulation of the effluent from the second bed to the first bed completes the cycle during which inorganic cations are (1) displaced from the primary adsorption bed, (2) adsorbed on a smaller adsorption bed, and (3) replaced in the solution by hydrogen ions as a result of which the initial solution is regenerated. Circulation is continued until substantially all of the inorganic cations have been removed; this is indicated by a decrease in the pH of the effluent from the primary resin adsorbate bed from about 7.5 to about 6.2.

The basic antibiotic purified of contaminating inorganic cations can be eluted from the primary resin bed by techniques well known to the art. A particularly suitable method involves contact of the adsorbate with 0.75 N sulfuric acid whereupon the antibiotic is displaced in a desorption process and is removed in the form of its water-soluble sulfate salt. The excess sulfuric acid in the effluent not required for combination with the antibiotic as a salt is removed by precipitation with a reagent such as barium hydroxide or, alternatively, by contact of the solution with a weakly basic ion-exchange resin. The solution remaining after removal of the precipitated salt is a very highly purified form of the antibiotic. This material may be filtered to obtain a solution which may be used directly in therapy, in animal nutrition, or for other purposes. It may be dried, for instance, by lyophilization, to yield a product which is eminently suitable for incorporation in pharmaceutical products. The solution may be sterilized and it may be combined with stabilizers or other useful substances.

Exceptionally low final ash contents can be obtained by sending the eluted and neutralized antibiotic-containing solution through a cation-exchange bed in the hydrogen ion form, wherein the remaining traces of inorganic cations are removed substantially as described in U.S. Patent 2,960,437.

While in the process as described, the de-ashing solution is circulated through the adsorbate for a time prior to being introduced to the ash-trap cation-exchange bed, it is not necessary to so delay introduction of the solution to the ash-trap; it is preferred to do so to minimize the possibility of some slight loss in overall efficiency.

A preferred embodiment of the process, particularly in large-scale plant operation, consists of splitting the effluent stream from the primary adsorbate bed diverting only a part of it through the ash-trap and circulating the rest back through the adsorbate bed. This allows the pH of the de-ashing solution to be maintained within narrower limits than are permitted without such a stream-splitting technique. While it is known that the de-ashing solution is effective over broad ranges of pH as from about pH 4.0 to about 7.5 it is found particularly preferable to maintain the pH within narrower limits since this will minimize the tendency for the solution to desorb the basic antibiotic. An illustrative example is found in the case of streptomycin for which the optimum pH of the de-ashing solution is about 5.5 to about 5.7. Here, the pH of the effluent from the primary adsorbate bed decreases from about 7.5 to about 6.2 during removal of inorganic cations and the pH of the effluent from the ash-trap increases from about 2.0 to about 5.0 during the exchange of said inorganic cations for hydrogen ions. Consequently, in the preferred embodiment of this invention, at the beginning of a run correspondingly less of the effluent leaving the adsorbate bed at pH 7.5 is diverted to the ash-trap from which it leaves at pH 2.0; and a pH of about 5.5 to 5.7 is maintained in the de-ashing solution by mixing the effluents from both beds. As the pH of the effluent from the primary adsorbate bed decreases and the pH of the effluent from the ash-trap bed increases, the amount of the diversion to the ash-trap is increased until at the end of the de-ashing operation substantially all of the effluent from the adsorbate bed is allowed to pass through the ash-trap.

In the practice of instant invention the primary resin first used to prepare the adsorbate bed will be a particulate synthetic cross-linked cation-exchange resin. Said resins having particle sizes of from about 10 to about 400 mesh, U.S. Sieve Series can be used, but it is preferred to select one having a particle size of about 10 to about 50 mesh, and having a specific gravity in excess of about 1.0. Suitable resins are well known in the antibiotic recovery art and have been widely described in the literature. It is particularly preferred in recovering streptomycin, neomycin, viomycin, polymixin and other basic antibiotics to employ resins which derive their ion-exchange capacity from carboxylic groups. Such resins are commercially available and a suitable example is the resin known commercially as Amberlite IRC–50, available from The Rohm & Haas Company of Philadelphia. They are described in detail in U.S. Patent 2,340,111. Other suitable carboxylic resins may be prepared by copolymerizing a monounsaturated carboxylic acid and a cross-linking agent, that is, a compound having a polymerizable terminal methylene group and at least one other polymerizable grouping. Among the appropriate carboxylic acids are acrylic, alpha-alkylacrylic and the like.

Examples of suitable cross-linking agents include divinylbenzene, ethylene glycol dimethacrylate, allyl methacrylate, butadiene, allyl methyl maleate, and the like. In some cases it may be convenient to copolymerize the unsaturated carboxylic acid in the form of an ester or an anhydride, and to hydrolyse the resulting copolymer, but where the cross-linking agent contains a hydrolyzable ester group such procedure will usually not be practical. The copolymers of acrylic or methacrylic acid with divinylbenzene are ordinarily preferred because of their ready availability and excellent stability. For optimum physical properties resins prepared from polymerization mixtures containing at least about one percent divinylbenzene are to be selected, and for efficient utilization of resin capacity, a level not exceeding about ten percent divinylbenzene is preferred. Resins prepared with up to about 25 percent divinylbenzene concentrations may be utilized, but their capacity for streptomycin and other antibiotics will be lower. Particularly preferred are the copolymers of acrylic or methacrylic acid with about 2.5 percent to about 5 percent divinylbenzene. Since practically no adsorption occurs if the resin is in the free acid form, it is employed at least partially, and preferably completely, in the form of a salt, particularly a salt formed with a monovalent cation. The resin may, for example, be employed in the sodium or ammonium cycle.

The particulate cation-exchange resin used in the ash-trap bed may obtain its exchange capacity from carboxylic or sulfonic groups. However, because of the aforesaid affinity of carboxylic resins for basic antibiotics, particularly, for example, neomycin it is preferable to use a sulfonic acid cation resin in the ash-trap bed. Suitable resins can be prepared by crosslinking, for example, p-hydroxybenzene-sulfonic acid with formaldehyde or by sulfonating crosslinked polystyrene copolymers. Resins which are copolymers of sulfonated polystyrenes and divinyl aromatic compounds such as divinyltoluene, divinylbenzene, divinylxylene, and so forth, are particularly useful. Resins of this nature are available commercially from the Dow Chemical Co. under the trade name "Dowex-50." These contain varying proportions of divinylbenzene as the cross-linking component. A proportion of from about 8 percent to about 16 percent of copolymerized divinylbenzene is preferred, although considerably lower or higher proportions, for example, between about 1 percent and about 24 percent of divinylbenzene may be used for this purpose. This type of resin is described in U.S. Patent 2,366,007. The resin for this stage of the process is utilized in its acid form.

If, as mentioned above, it is found desirable to use a final purification bed to achieve exceedingly low final ash contents, the neutralized eluate from the primary absorption bed may be passed through a cation-exchange resin in the acid form. This resin may derive its cation-exchange capacity from carboxylic or sulfonic acid groups. However, because it is preferred to use a resin with low adsorption capacity for basic antibiotics in this step, it is preferred to use the same type of sulfonic acid ion-exchange resin that is used in the ash-trap.

While ethylene diamine tetracetic acid sodium salt is a particularly preferred agent to be used if a polyvalent inorganic ion-complexing step is used in combination with the instant process, other chelating agents may be used. Suitable chelating agents are, for example, alpha-amino acids including: triglycine, glycine, sarcosine, and others, nitrilotriacetic acid, N,N,N',N'',N'''-diethylenetriamine pentacetic acid and the like, as well as other types of inorganic ion complexing agents such as critic acid, sodium tripolyphosphate and the like. The amount of said agent to be added to the de-ashing solution may vary over a wide range; it is usually convenient to employ concentrations of about 0.5 to about 10 percent by weight. However, since there is some tendency for elution of the antibiotics at higher concentrations of said agents, it is preferred to employ about 0.5 to about 3 percent solutions. In the practice of that embodiment of the present invention wherein the said agent is added to the de-ashing solution, it is usually found that the said solutions can be used to de-ash about four separate adsorption beds before it is necessary to prepare fresh reagents.

The pH of the aqueous solution of inorganic ion-complexing agent, if used in that embodiment wherein said agent is added to the de-ashing solution, may be brought to the desired value by addition of an acid or base thereto. For example, if the said agent is, N,N,N',N'-ethylenediamine tetracetic acid, sodium hydroxide can be added to bring the pH up to the preferred level. If, on the other hand, the tetrasodium salt of said chelating agent is used, a water soluble acid such as sulfuric, acetic or the like can be added to bring the pH from about 11 down to the preferred level. Alternatively, the pH can be brought down by circulation through the ash-trap resin for a time prior to introduction of the said complexing solution into the adsorbate bed.

It is particularly convenient to prepare the complexing agent from the tetrasodium salt of N,N,N',N'-ethylenediamine tetracetic acid and to adjust the pH to from about 4.0 to about 7.5 by the addition of acetic acid.

If one of the embodiments is employed wherein polyvalent inorganic cation-complexing agents are used in prior or subsequent steps, the de-ashing solution may be conveniently prepared, for example, by adding sodium hydroxide solution to a solution of acetic acid as is exemplified in detail hereinafter.

Among the antibiotics which may be purified by the present process are streptomycin, neomycin, viomycin, dihydrostreptomycin, hydroxystreptomycin, streptothricin, mannosidostreptomycin, polymyxin and others of this nature. These all contain highly basic groups, such as guanidino groups and they may be purified with unexpected ease by the process of the present invention.

The following examples are given by way of illustration, and are not to be regarded as limitations of this invention, many variations of which are possible without departing from its spirit or scope.

*Example I*

Streptomycin fermentation broth having a potency of about 1000 streptomycin units per ml. is filtered after an adjustment of pH to about 2.5. The filtered solution is passed over a bed of Amberlite IRC-50 resin at a pH of about 7.5, that is, the fermentation broth is adjusted to 7.5 with sodium hydroxide and the resin is equilibrated at this pH by contact with a diluted solution of sodium hydroxide. After adsorption of the antibiotic on the resin, the resin bed is washed with a small volume of water and the wash discarded. A solution of 0.1 N acetic acid is prepared and the pH is adjusted to 5.6 by the addition of a 10 percent sodium hydroxide solution. This solution is pumped through the adsorbate bed and the effluent leaving the column at a pH of 7.2, is split into two parts. The first part is returned to the feed tank; the second part is passed into a second, smaller resin bed, the ash-trap, which contains Dowex 50-X16 type resin in the acid cycle. The effluent from the ash-trap leaving the column at a pH of about 2.0, is sent to the feed tank where it is mixed with the first portion of the effluent from the adsorbate bed. The amount of the effluent from the primary adsorbate bed which is allowed to pass through the ash-trap is adjusted so that, after re-mixing in the feed tank, the pH of the solution is maintained at 5.5–5.7. During the course of 2 to 3 hours, the pH of the effluent from the primary adsorbate bed is observed to fall from 7.2 to 6.1, while the pH of the effluent from the ash-trap is observed to rise from 2.0 to about 5.0. Hence, larger portions of the primary effluent are diverted through the ash-trap as the run progresses and the pH of the feed is maintained at 5.5–5.7. When the pH of the effluent from the primary bed reaches 6.2, the feed is discontinued and the resin bed containing the adsorbed antibiotic is washed with several volumes of water. The antibiotic, together with polyvalent inorganic cations, then is eluted with 0.75 N sulfuric acid. The excess of sulfuric acid in the eluate is neutralized with barium hydroxide. An analysis of a filtered sample indicates an ash content of 2.0 percent, and a calcium content of 6500 p.p.m. on a streptomycin basis.

To remove polyvalent inorganic cations from this solution, sodium oxalate is added to the batch until the calcium level is 500 p.p.m. on a streptomycin basis. At this point, only a slight precipitate is formed by further addition of sodium oxalate and no excess oxalate is present as is evidenced by the fact that no precipitate is formed upon the addition of calcium chloride to a filtered sample. This solution is filtered and the filtrate is found to have an ash content of 2.0 percent on a streptomycin basis. This represents a high purity product very suitable for pharmaceutical use.

The procedure described is repeated substituting a clarified neomycin-containing fermentation broth for the corresponding streptomycin broth. However, in this case, the effluent from the primary bed is allowed to drop to 4.8 before circulation to the ash-trap is discontinued. Substantially the same results are obtained. The procedure is repeated substituting a clarified viomycin-containing fermentation broth for the corresponding streptomycin broth and discontinuing circulation to the ash-trap when the pH of the effluent from the primary resin bed drops to 5.2. Substantially the same results are obtained.

*Example II*

Streptomycin fermentation broth having a potency of about 1000 steptomycin units per ml. is filtered before an adjustment of pH to about 2.5. The filtered solution is passed over a bed of Amberlite IRC-50 resin at a pH of about 7.5, that is, the fermentation broth is adjusted to 7.5 with sodium hydroxide and the resin is equilibrated at this pH by contact with a diluted solution of sodium hydroxide. A solution is prepared containing 0.8 percent by weight of ethylenediamine tetracetic acid tetrasodium salt and the pH is adjusted from an initial 11.0 to a final 7.0–7.5 by the addition of sulfuric acid. This solution is pumped through the resin bed loaded with streptomycin, the effluent being recycled to the bed, and pumping is continued for 4 hours. Hourly measurements of the sequestering ability are made (Schwarzenbach, T. Chimia, 2, 56, 1948). After the third hour, a leveling out is observed, and the sequestering ability is unchanged after the fourth hour. At this point, the circulation of the solution is discontinued and the adsorbate bed is washed with 2-3 volumes of water. A solution of 0.1 N acetic acid is next prepared and the pH is adjusted to 5.6 by the addition of 20 percent sodium hydroxide solution. This solution is pumped through the resin bed loaded with streptomycin and the effluent exiting at a pH of 7.2 is split into two parts. The first part is returned to the feed tank; the second part is passed into a second, smaller resin bed, the ash-trap, which contains Dowex 50-X16-type resin in the acid cycle. The procedure from this point is carried out in the same manner as described in Example I, the circulation being discontinued when the effluent from the primary bed reaches a pH of 6.2. After washing the adsorbate bed with 2-3 volumes of water the antibiotic is eluted from the adsorbate with 0.65 N sulfuric acid. The excess sulfuric acid in the eluate is neutralized with barium hydroxide and the resulting barium sulfate is removed by filtration. The filtered eluate has an ash content of 1 percent and a calcium content of 50 p.p.m., both on a streptomycin basis. This represents a high purity product very suitable for pharmaceutical use.

The procedure described is repeated substituting a clarified neomycin-containing fermentation broth for the corresponding streptomycin broth. However, in this case, the effluent from the primary bed is allowed to drop to 4.8 before circulation to the ash-trap is discontinued. Substantially the same results are obtained. The procedure is repeated substituting a clarified viomycin-containing fermentation broth for the corresponding streptomycin broth and discontinuing circulation to the ash-trap when the pH of the effluent from the primary resin bed drops to 5.2. Substantially the same results are obtained.

*Example III*

Streptomycin fermentation broth having a potency of about 1000 streptomycin units per ml. is filtered after an adjustment of pH to about 2.5. The filtered solution is passed over a bed of Amberlite IRC-50 resin at a pH of about 7.5, that is, the fermentation broth is adjusted to 7.5 with sodium hydroxide and the resin is equilibrated at this pH by contact with a diluted solution of sodium hydroxide. After adsorption of the antibiotic on the resin, the resin bed is washed with a small volume of water and the wash discarded. A solution is prepared containing 0.8 percent by weight of ethylenediamine tetracetic acid tetrasodium salt and the pH is adjusted from an initial 11.0 to a final 5.8 by the addition of glacial acetic acid. This solution is pumped through the resin bed loaded with streptomycin, the effluent being recycled to the bed, and pumping is continued for four hours. Periodic measurement of sequestering ability is made hourly; after the third hour a leveling out is observed and the sequestering ability is unchanged after the fourth hour. The eluate from the adsorbate bed is then passed into a second smaller resin bed, the ash-trap, which contains Dowex 50-X16 type resin in the acid cycle, that is, it has been equilibrated by contact with a dilute solution of sulfuric acid. The effluent from the second, smaller bed is returned to the primary resin bed and cycling is continued. The pH of the effluent from the primary adsorption bed is observed to fall from 7.5 to 6.2 while the pH of the effluent from the secondary ash-trap bed is observed to rise from 2.0 to 5.0. This cycling operation is discontinued when the pH reaches 6.2 and the primary resin bed containing the adsorbed antibiotic is washed with water then is eluted with 0.75 N sulfuric acid. The excess sulfuric acid in the eluate is neutralized with barium hydroxide and the resulting barium sulfate is removed by filtration. The neutral eluate has an ash content corresponding to one percent of the weight of the clarified solution. This represents a high purity product very suitable for pharmaceutical use.

The eluate is passed at the rate 0.4 bed volume per minute over a resin bed containing Dowex 50-X16 type resin in the acid cycle. The amount of resin used corresponds to 0.2 gallons per billion units of streptomycin in the eluate. The effluent is neutralized with barium hydroxide and the resulting barium sulfate is filtered. Concentration of the solution under vacuum, treatment with a small amount of activated carbon, and addition to several volumes of methanol yields a precipitate of streptomycin sulfate of high purity. This material is filtered and dried under vacuum. It is found to contain 0.25% ash based on the streptomycin and only two percent of the streptomycin activity is lost by adsorption in the ion-exchange bed.

*Example IV*

A resin bed is loaded with streptomycin exactly as described in Example III. However, in this case, the adsorbate is not subjected to the de-ashing step contemplated by the present invention. The adsorbate is washed with water and then eluted with 0.75 N sulfuric acid. The eluate, which contains 35 percent ash based on the clarified solution after treatment with barium hydroxide and filtration, then is passed at a rate of 0.1 bed volumes per minute through a Dowex 50-X16 type resin bed four times as large as that used with the corresponding eluate in Example III, that is, the amount of resin used corresponds to 0.8 gallon per billion units of streptomycin in the eluate. After isolation in the manner described in Example III, there is obtained streptomycin sulfate with 0.6 percent ash content. Seven percent of the streptomycin activity is lost by adsorption on the resin bed.

*Example V*

Filtered streptomycin fermentation broth is adjusted to pH 7.5 and the broth is fed at a rate of 13.2 liters per minute to a bed containing 33 liters of Amberlite IRC-50 resin which has previously been equilibrated at pH 7.5 with sodium hydroxide solution. The feed is continued until the resin no longer absorbs streptomycin. The adsorbate is washed with water to remove residual broth. The resin bed is treated with 82 liters of a solution of ethylenediamine tetracetic acid acidified with acetic acid to pH 5.8 as in Example III except that, in this case, at the beginning a part of the effluent flow is diverted through the external ash-trap bed containing 8 liters of Dowex 50-X16 resin in the acid form. As the de-ashing process is continued, relatively larger proportions of the effluent from the primary adsorbate bed are diverted through the ash-trap bed and the amount of such diversion is continually adjusted so that after mixing the eluates from both columns, a pH of 5.5 to 5.7 can be maintained. After about six hours, substantially all of the eluate from the primary adsorbate bed is being diverted through the ash-trap bed and the pH of the eluate from the primary bed has dropped to 6.0–6.2 and flow is discontinued. Streptomycin is then eluted with 45 gallons of dilute sulfuric acid solution and the eluate after neutralization with barium hydroxide is found to contain only one percent ash based on the clarified solution and to be eminently suitable for most pharmaceutical applications.

*Example VI*

The process as described in Example III is carried out in an identical manner except that instead of ethylene diamine tetracetic acid sodium salt chelating agent there is substituted 2.0 percent of citric acid and the pH is adjusted to 5.8 with sodium hydroxide. The eluate contains 1.5 percent ash. The streptomycin sulfate isolated in the manner described contains only 0.25% of ash.

Example VII

The process as described in Example III is carried out in an identical manner with a clarified neomycin-containing fermentation broth substituted for the corresponding streptomycin broth. However, in this case, the pH of the effluent from the primary bed is allowed to drop to 4.8 before circulation to the ash-trap is discontinued. The eluate provides a solution with very low ash content and which, after neutralization, can be used directly or may be further treated to recover neomycin in a form suitable for therapeutic administration.

The procedure of Example III is repeated using a clarified viomycin-containing fermentation broth instead of the streptomycin broth and discontinuing circulation to the ash-trap when the pH of the effluent from the primary resin bed drops to 5.2. The eluate has a low ash content and, after neutralization, is suitable for most therapeutic purposes without substantial additional processing.

Example VIII

*Preparation of sulfonated crosslinked polystyrene cation-exchange resins.*—Two mixtures of styrene monomer and, respectively, 8 and 20 percent by weight of divinylbenzene and 1 percent of benzoyl peroxide are agitated and suspended in an equal volume of a 0.15 percent aqueous solution of polyvinyl alcohol at 85 degrees C. After 24 hours at this temperature the suspension is cooled, the copolymer beads are removed on a screen and washed with water, and after air-drying, are screened to a mesh size of about 14 to 45 on the U.S. Standard Sieve scale. The beads are slowly added to an excess of concentrated sulfuric acid and the temperature of the suspension is raised to 100 degrees C. and maintained there for 8 hours; 1 percent of silver sulfate is used as catalyst. After sulfonation, the suspension is treated with ice and water and the beads are washed with water until the pH of the wash water becomes constant.

*Preparation of carboxylic acid-ion exchange resins.*—Three mixtures of methacrylic acid and, respectively, 2, 5 and 10 percent by weight of divinylbenzene are treated with 1 percent benzoyl peroxide catalyst and are polymerized by heating in a closed vessel at 60 degrees C. for 24 hours. The resulting polymers are ground to fine particle size, washed with 8 percent aqueous sodium hydroxide, rinsed with water and screened to a mesh range of about 14 to 45 on the U.S. Standard Sieve scale. The screened resins are washed with 3 volumes of 2 N hydrochloric acid, then with water.

*Preparation of a sulfonated phenol-formaldehyde condensate cation-exchange resin.*—Phenol is treated with a 1.2 mol ratio of concentrated sulfuric acid at 100 degrees C. for 2 hours. The p-hydroxybenzensulfonic acid formed thereby is treated with a 2 mol ratio of formaldehyde and the resulting gel is cooled, ground and washed with sodium carbonate solution, then is dried, reground and screened to a mesh range of about 14 to 45 on the U.S. Standard Sieve scale.

The procedure of Example I is repeated with the synthetic particulate sulfonated polystyrene crosslinked with 8 percent divinylbenzene prepared as described above and converted to the acid form substituted for the corresponding Dowex 50–X16 resin in the ash-trap bed. Substantially the same results are obtained.

Additional purifications are carried out according to the procedure of Example I substituting for the Dowex 50–X16 in the ash-trap, the following listed particulate cation-exchange resins prepared as described above: sulfonated polystyrene crosslinked with 20 percent divinylbenzene; polymethacrylic acid crosslinked with 2, 5 and 10 percent divinylbenzene; and a sulfonic acid derivative of a phenol-formaldehyde condensate. Substantially the same results are obtained.

What is claimed is:

1. In a process for separating inorganic cations from a basic antibiotic adsorbed on a particulate carboxylic acid-type cation-exchange resin by contacting the resin antibiotic adsorbate with an aqueous solution adjusted to a pH of from about 4.0 to about 7.5, contacting the effluent from said resin antibiotic adsorbate with a second particulate cation-exchange resin in the hydrogen ion form to adsorb inorganic cation impurities, recycling the effluent from said second resin adsorption into contact with said first resin antibiotic adsorbate, and continuing said cycling until the adsorption of said inorganic cations upon said second resin is substantially complete.

2. A process as in claim 1 wherein said second resin is a synthetic cation-exchange resin deriving its exchange capacity from sulfonic groups.

3. A process as in claim 2 wherein said second resin is a sulfonated copolymer of styrene together with 8 to 20 percent by weight of divinylbenzene.

4. A process as in claim 1 wherein said basic antibiotic is streptomycin.

5. A process as in claim 1 wherein said basic antibiotic is neomycin.

6. A process as in claim 1 wherein said basic antibiotic is viomycin.

7. A process according to claim 1 wherein, prior to contacting the resin antibiotic adsorbate with the aqueous solution adjusted to a pH of from about 4.0 to 7.5, the adsorbate is contacted with an aqueous solution of polyvalent inorganic cation-sequestering agent until polyvalent inorganic cations are substantially completely removed.

8. A process as in claim 7 wherein said basic antibiotic is streptomycin.

9. A process as in claim 7 wherein said basic antibiotic is neomycin.

10. A process as in claim 7 wherein said basic antibiotic is viomycin.

References Cited by the Examiner

UNITED STATES PATENTS

| | | | |
|---|---|---|---|
| 2,656,347 | 10/1953 | Goett | 167—65 |
| 2,667,441 | 1/1954 | Nager | 167—65 |
| 2,765,302 | 10/1956 | Bastels | 167—65 |
| 2,793,978 | 5/1957 | Wachtel | 167—65 |
| 2,827,417 | 3/1958 | Friedman | 167—65 |
| 2,848,365 | 8/1958 | Jackson | 167—72 |
| 2,960,437 | 11/1960 | Friedman | 167—72 |

SAM ROSEN, *Primary Examiner.*